(12) United States Patent
Chen et al.

(10) Patent No.: US 10,904,821 B2
(45) Date of Patent: Jan. 26, 2021

(54) USER EQUIPMENTS (UES), CELLULAR STATIONS, AND ACCESS CONTROL METHODS THEREOF

(71) Applicant: MEDIATEK INC., Hsin-Chu (TW)

(72) Inventors: Yih-Shen Chen, Hsin-Chu (TW); Chun-Fan Tsai, Hsin-Chu (TW); Tsang-Wei Yu, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/401,381

(22) Filed: May 2, 2019

(65) Prior Publication Data
US 2019/0342820 A1    Nov. 7, 2019

Related U.S. Application Data

(60) Provisional application No. 62/666,819, filed on May 4, 2018.

(51) Int. Cl.
*H04W 88/02* (2009.01)
*H04W 48/02* (2009.01)
*H04W 84/04* (2009.01)

(52) U.S. Cl.
CPC .......... *H04W 48/02* (2013.01); *H04W 84/042* (2013.01); *H04W 88/02* (2013.01)

(58) Field of Classification Search
CPC .............................. H04W 48/02; H04W 88/02
See application file for complete search history.

(56) References Cited

U.S. PATENT DOCUMENTS 10,285,122 B2    5/2019  Li
2013/0045735 A1* 2/2013  Kim .................. H04W 36/0094
                                                 455/422.1

FOREIGN PATENT DOCUMENTS

CN    106507405 A    3/2017

OTHER PUBLICATIONS

"LS on network-based CRS interference mitigation;" 3GPP TSG-RAN WG4 Meeting #86bis; Apr. 2018; pp. 1-1.
"Access Control for NR;" 3GPP TSG-RAN WG2 #97bis; Apr. 2017; pp. 1-5.
"Way forward on Network-based CRS interference mitigation;" 3GPP TSG-RAN Meeting #78; Dec. 2017; pp. 1-3.

* cited by examiner

*Primary Examiner* — Angel T Brockman
(74) *Attorney, Agent, or Firm* — McClure, Qualey & Rodack, LLP

(57) ABSTRACT

A User Equipment (UE) including a wireless transceiver and a controller is provided. The wireless transceiver performs wireless transmission and reception to and from a cell. The controller receives first barring information and second barring information from the cell via the wireless transceiver, and ignores the first barring information in response to the UE supporting network-based Cell-specific Reference Signal (CRS) interference mitigation. Also, the controller allows the UE to access the cell in response to the UE supporting network-based CRS interference mitigation and the second barring information indicating that the cell is not barred.

18 Claims, 5 Drawing Sheets

USER EQUIPMENTS (UES), CELLULAR STATIONS, AND ACCESS CONTROL METHODS THEREOF

CROSS REFERENCE TO RELATED APPLICATIONS

This Application claims priority of U.S. Provisional Application No. 62/666,819, filed on May 4, 2018, the entirety of which is incorporated by reference herein.

BACKGROUND OF THE APPLICATION

Field of the Application

The application generally relates to mobile communications, and more particularly, to User Equipments (UEs), cellular stations, and access control methods thereof.

Description of the Related Art

In a typical mobile communication environment, a UE (also called a Mobile Station (MS)), such as a mobile telephone (also known as a cellular or cell phone), or a tablet Personal Computer (PC) with wireless communications capability, may communicate voice and/or data signals with one or more service networks. The wireless communications between the UE and the service networks may be performed using various cellular technologies, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, Time Division LTE (TD-LTE) technology, and others.

According to the 3GPP specifications and/or requirements in compliance with LTE-based technology, a special type of reference signals, called Cell-specific Reference Signals (CRS) are transmitted all over the full bandwidth of the LTE standard. A UE can exploit the presence of the CRS symbols for various Layer one (L1) operations, such as Automatic Gain Control (AGC), Automatic Frequency Control (AFC), time tracking, frequency tracking, and channel estimation, etc. However, CRS transmissions across the full bandwidth of the LTE standard may cause inter-cell interference among intra-frequency cells and decrease downlink throughput.

In order to reduce interference and improve downlink throughput, a new feature called "lean carrier" was introduced to the LTE-A standard, which aims to minimize transmissions not directly related to the delivery of user data. Specifically, the lean carrier feature works by muting CRS transmissions in some Physical Resource Blocks (PRBs) of some specific subframes. Nevertheless, if a cell enables the lean carrier feature, UEs not supporting this feature (also called non-lean-carrier-capable UEs) may mistakenly use non-existing CRS symbols for channel estimation, which may degrade demodulation performance.

Therefore, it is desired to have a control mechanism to ensure that the non-lean-carrier-capable UEs are not affected by the newly introduced lean carrier feature.

BRIEF SUMMARY OF THE APPLICATION

The present application proposes a control mechanism which introduces additional barring information in a broadcast message to indicate whether the UEs supporting the lean carrier feature (or called herein network-based CRS interference mitigation) are allowed to access a cell enabling the lean carrier feature, and uses the existing barring information in a broadcast message to indicate that the UEs not supporting the lean carrier feature are not allowed to access this cell.

In a first aspect of the application, a User Equipment (UE) comprising a wireless transceiver and a controller is provided. The wireless transceiver is configured to perform wireless transmission and reception to and from a cell. The controller is configured to receive first barring information and second barring information from the cell via the wireless transceiver, ignore the first barring information in response to the UE supporting network-based Cell-specific Reference Signal (CRS) interference mitigation, and allow the UE to access the cell in response to the UE supporting network-based CRS interference mitigation and the second barring information indicating that the cell is not barred.

In a second aspect of the application, an access control method, executed by a UE communicatively connected to a cell, is provided. The access control method comprises the steps of: receiving first barring information and second barring information from the cell; ignoring the first barring information in response to the UE supporting network-based CRS interference mitigation; and allowing the UE to access the cell in response to the UE supporting network-based CRS interference mitigation and the second barring information indicating that the cell is not barred.

In a third aspect of the application, an access control method, executed by a cellular station forming a cell to serve a UE, is provided. The access control method comprises the steps of: setting first barring information to indicate that the cell is barred for UEs not supporting network-based CRS interference mitigation and setting second barring information to indicate whether the cell is barred for UEs supporting network-based CRS interference mitigation, in response to the cellular station enabling network-based CRS interference mitigation; and sending the first barring information and the second barring information to the UE.

Other aspects and features of the present application will become apparent to those with ordinarily skill in the art upon review of the following descriptions of specific embodiments of the UEs, the cellular stations, and the access control methods thereof.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
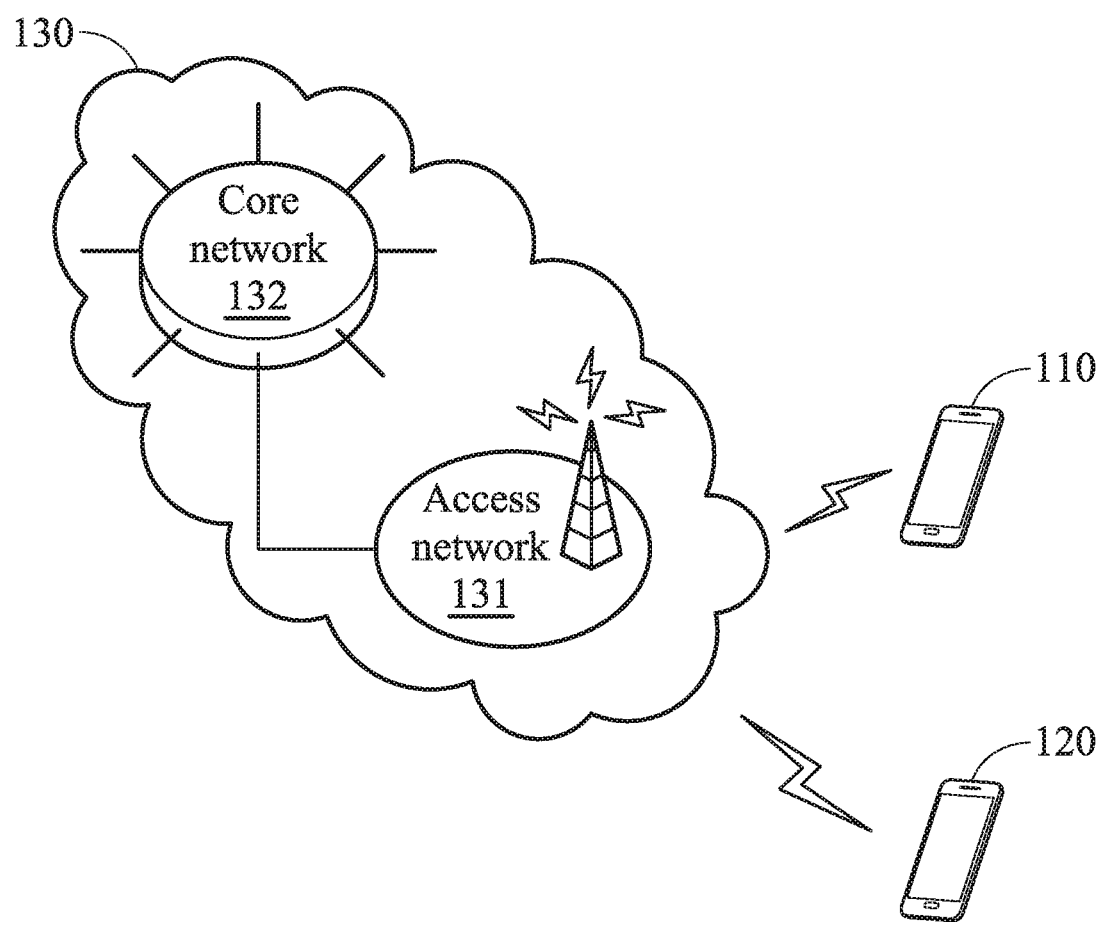
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 may include a lean-carrier-capable User Equipment (UE) 110, a non-lean-carrier-capable UE 120, and a service network 130, wherein the lean-carrier-capable UE 110 and the non-lean-carrier-capable UE 120 may be wirelessly and communicatively connected to the service network 130 for receiving barring information and obtaining mobile services if access is allowed according to the barring information, wherein the barring information may include first barring information for non-lean-carrier-capable UEs (or called herein network-based CRS interference mitigation), and second barring information for lean-carrier-capable UEs.

Each of the lean-carrier-capable UE 110 and the non-lean-carrier-capable UE 120 may be a feature phone, a smartphone, a panel Personal Computer (PC), a laptop computer, or any wireless communication device supporting at least the cellular technology utilized by the service network 130. Regarding the non-lean-carrier-capable UE, it could be a legacy UE or a new UE that does not support the lean-carrier feature.

Specifically, the lean-carrier-capable UE 110 may refer to any UE supporting network-based CRS interference mitigation, while the non-lean-carrier-capable UE 120 may refer to any UE not supporting network-based CRS interference mitigation.

The service network 130 may include an access network 131 and a core network 132. The access network 131 is responsible for processing radio signals, terminating radio protocols, and connecting the lean-carrier-capable UE 110 and/or the non-lean-carrier-capable UE 120 with the core network 132, while the core network 132 is responsible for performing mobility management, network-side authentication, and interfaces with a public/external data network (e.g., the Internet).

In one embodiment, the service network 130 may be an LTE-based network, such as an LTE network, LTE-A network, or TD-LTE network, and the access network 131 may be an Evolved-Universal Terrestrial Radio Access Network (E-UTRAN) and the core network 132 may be an Evolved Packet Core (EPC).

An E-UTRAN may include at least one cellular station, e.g., an evolved NodeBs (eNB), including macro eNBs, femto eNBs, or pico eNBs, each of which may form a cell for providing mobile services to the lean-carrier-capable UE 110 and/or the non-lean-carrier-capable UE 120. In particular. Each cellular station may enable network-based CRS interference mitigation to serve only the UEs supporting network-based CRS interference mitigation (e.g., the lean-carrier-capable UE 110).

An EPC may include at least a Home Subscriber Server (HSS), Mobility Management Entity (MME), Serving Gateway (S-GW), Packet Data Network Gateway (PDN-GW or P-GW), wherein each of the HSS, MME, S-GW, and P-GW may be implemented as a network element on a dedicated hardware (e.g., a controller, such as a processor, and/or a storage device, such as memory), or as a software instance running on a dedicated hardware.

It should be understood that wireless communication environment 100 is for illustrative purposes only and is not intended to limit the scope of the application. For example, the application could be applied to any future enhancement of the LTE-based technology, or other cellular technologies supporting network-based CRS interference mitigation.

Figure 2:
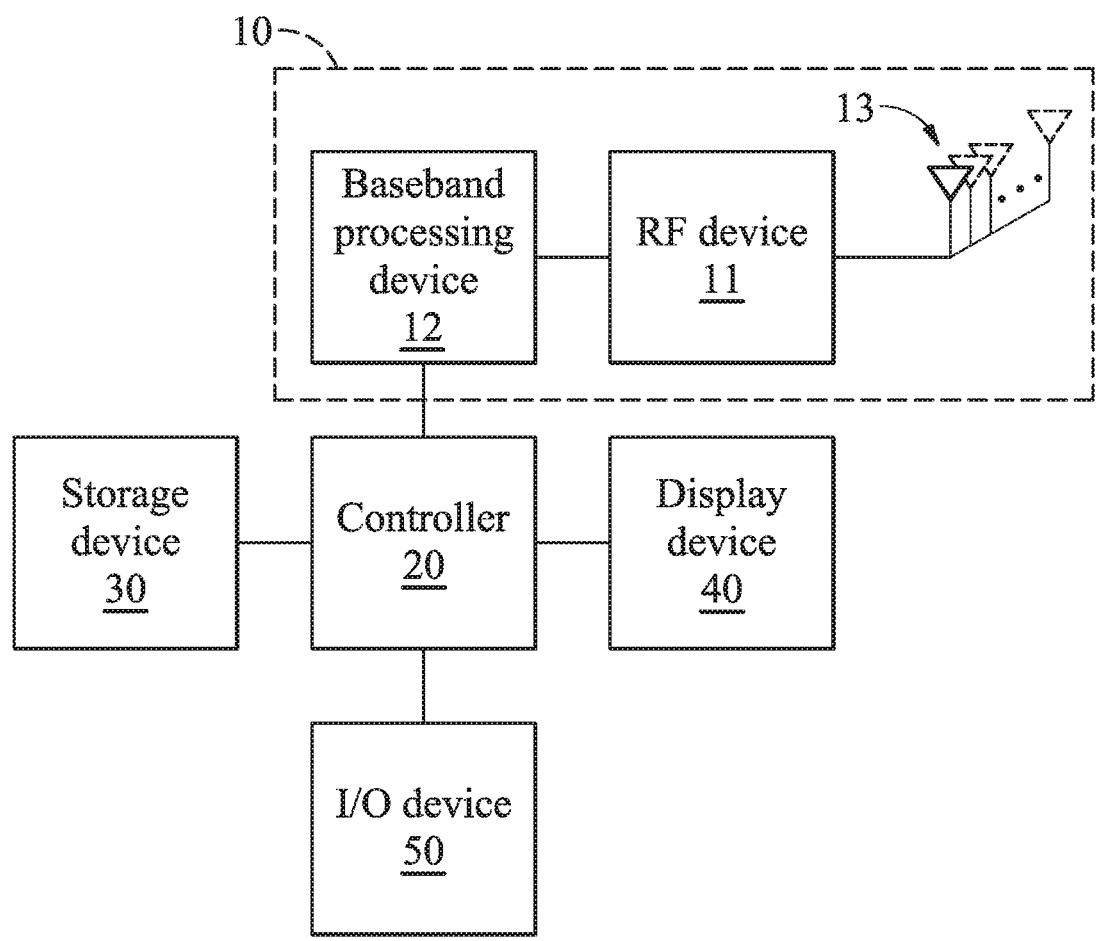
FIG. 2 is a block diagram illustrating a UE according to an embodiment of the application.

FIG. 2 is a block diagram illustrating a UE according to an embodiment of the application.

In this embodiment, the UE shown in FIG. 2 may refer to either the lean-carrier-capable UE 110 or the non-lean-carrier-capable UE 120.

A UE may include a wireless transceiver 10, a controller 20, a storage device 30, a display device 40, and an Input/Output (I/O) device 50.

The wireless transceiver 10 is configured to perform wireless transmission and reception to and from the cell(s) formed by the cellular station(s) of the access network 131.

Specifically, the wireless transceiver 10 may include a Radio Frequency (RF) device 11, a baseband processing device 12, and antenna(s) 13.

The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may include a mixer to multiply the baseband signals with a carrier oscillated in the radio frequency of the supported cellular technology, wherein the radio frequency may be 900 MHz, 2100 MHz, or 2.6 GHz utilized in LTE-based (e.g., LTE/LTE-A/TD-LTE) systems, or another radio frequency, depending on the cellular technology in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the service network 130, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 may coordinate the aforementioned operations of the wireless transceiver 10, the storage device 30, the display device 40, and the I/O device 50 for performing the access control method of the present application.

In another embodiment, the controller 20 may be incorporated into the baseband processing device 12, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the access control method of the present application.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, a UE may include more components, such as a power supply, and/or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components. For example, a UE may not include the display device 40 and/or the I/O device 50.

Figure 3:
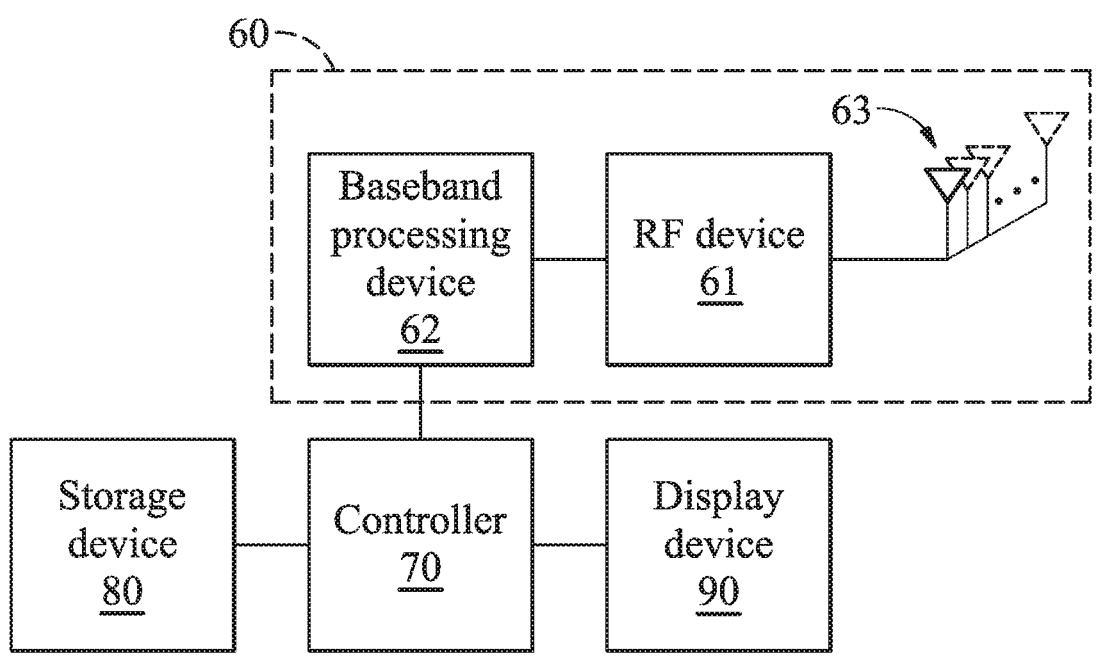
FIG. 3 is a block diagram illustrating a cellular station according to an embodiment of the application.

FIG. 3 is a block diagram illustrating a cellular station according to an embodiment of the application.

In this embodiment, the cellular station may enable network-based CRS interference mitigation.

As shown in FIG. 3, a cellular station may include a wireless transceiver, 60, a controller 70, a storage device 80, and an I/O device 90.

The wireless transceiver 60 is configured to form at least one cell for wireless communications with the lean-carrier-capable UE 110 and/or the non-lean-carrier-capable UE 120.

Specifically, the wireless transceiver 60 may include an RF device 61, a baseband processing device 62, and antenna(s) 63.

The baseband processing device 62 is configured to perform baseband signal processing and control the communications between subscriber identity card(s) (not shown) and the RF device 61. The baseband processing device 62 may contain multiple hardware components to perform the baseband signal processing, including ADC/DAC, gain adjusting, modulation/demodulation, encoding/decoding, and so on.

The RF device 61 may receive RF wireless signals via the antenna(s) 63, convert the received RF wireless signals to baseband signals, which are processed by the baseband processing device 62, or receive baseband signals from the baseband processing device 62 and convert the received baseband signals to RF wireless signals, which are later transmitted via the antenna(s) 63. The RF device 61 may also contain multiple hardware devices to perform radio frequency conversion. For example, the RF device 61 may include a mixer to multiply the baseband signals with a carrier oscillated in the radio frequency of the supported cellular technology, wherein the radio frequency may be 900 MHz, 2100 MHz, or 2.6 GHz utilized in LTE-based (e.g., LTE/LTE-A/TD-LTE) systems, or another radio frequency, depending on the cellular technology in use.

The controller 70 may be a general-purpose processor, an MCU, an application processor, a DSP, a GPU, an HPU, an NPU, or the like, which includes various circuits for providing the functions of data processing and computing, controlling the wireless transceiver 60 for wireless communications with the lean-carrier-capable UE 110, storing and retrieving data (e.g., program code) to and from the storage device 80, and receiving user inputs or outputting signals via the I/O device 90.

In particular, the controller 70 may coordinate the aforementioned operations of the wireless transceiver 60, the storage device 80, and the I/O device 90 for performing the access control method of the present application.

In another embodiment, the controller 70 may be incorporated into the baseband processing device 62, to serve as a baseband processor.

As will be appreciated by persons skilled in the art, the circuits of the controller 70 will typically include transistors that are configured in such a way as to control the operation of the circuits in accordance with the functions and operations described herein. As will be further appreciated, the specific structure or interconnections of the transistors will typically be determined by a compiler, such as an RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 80 may be a non-transitory machine-readable storage medium, including a memory, such as a FLASH memory or an NVRAM, or a magnetic storage device, such as a hard disk or a magnetic tape, or an optical disc, or any combination thereof for storing data, instructions, and/or program code of applications, communication protocols, and/or the access control method of the present application.

The I/O device 90 may include one or more buttons, a keyboard, a mouse, a touch pad, a video camera, a microphone, and/or a speaker, etc., to serve as the MMI for interaction with users.

It should be understood that the components described in the embodiment of FIG. 3 are for illustrative purposes only and are not intended to limit the scope of the application. For example, a cellular station may include more components, such as a power supply, and/or a display device, wherein the power supply may be a mobile/replaceable battery providing power to all the other components of the cellular station, and the display device may provide a display function.

Figure 4:
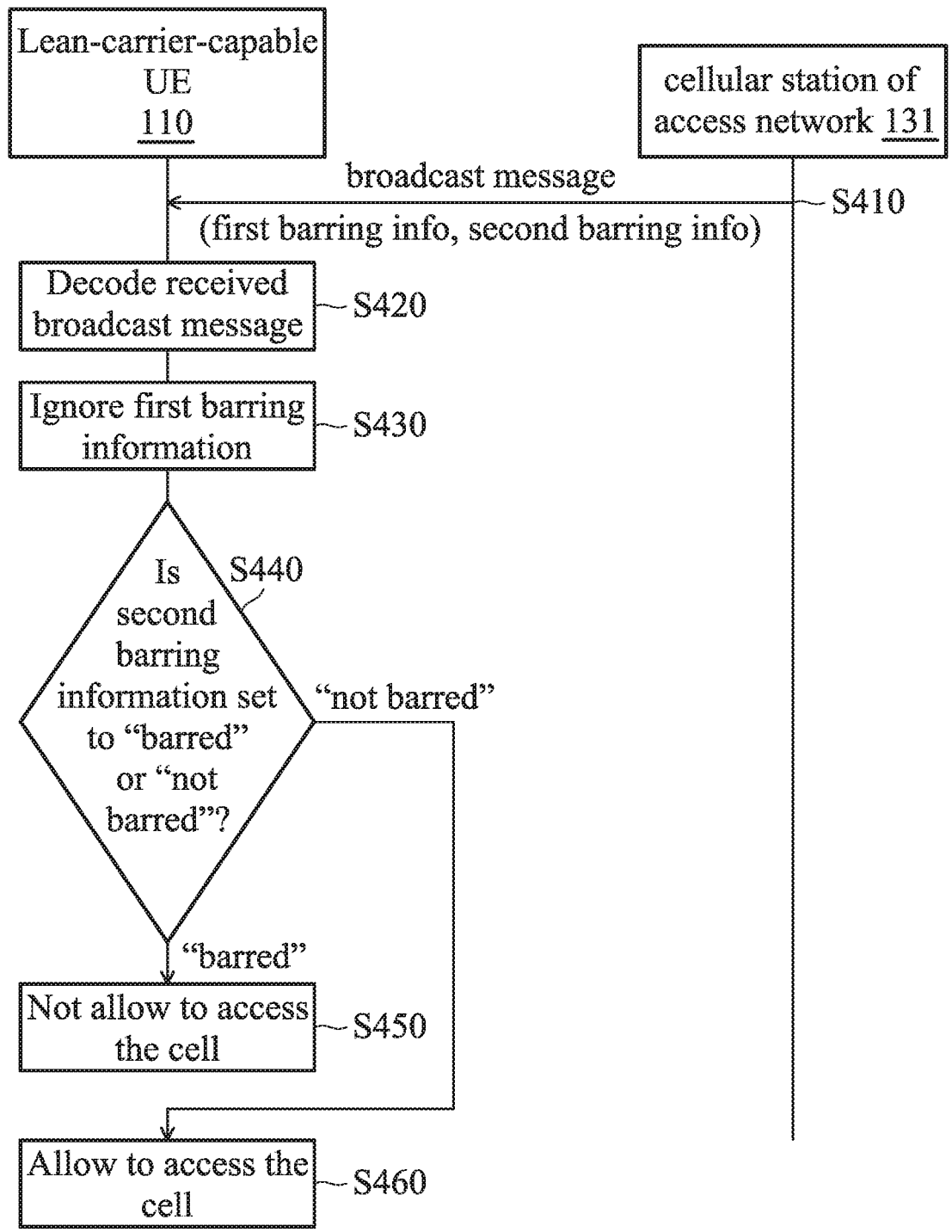
FIG. 4 is a message sequence chart illustrating the access control method according to an embodiment of the application.

FIG. 4 is a message sequence chart illustrating the access control method according to an embodiment of the application.

In this embodiment, the access control method is applied to and executed by a lean-carrier-capable UE (e.g., the lean-carrier-capable UE 110) and a cellular station (e.g., a cellular station of the service network 130) enabling network-based CRS interference mitigation.

To begin with, the cellular station sends a broadcast message (e.g., a System Information Block (SIB) type 1 message) to the lean-carrier-capable UE 110, wherein the broadcast message includes first barring information (e.g., a cellBarred Information Element (IE)) indicating that the cell is barred for UEs not supporting network-based CRS interference mitigation (i.e., non-lean-carrier-capable UEs) and second barring information (e.g., the cellBarred-CRS IE) indicating whether the cell is barred for UEs supporting network-based CRS interference mitigation (i.e., lean-carrier-capable UEs) (step S410).

Next, the lean-carrier-capable UE 110 receives and decodes the broadcast message (step S420), and then ignores the first barring information in response to the lean-carrier-capable UE 110 supporting network-based CRS interference mitigation (step S430).

Subsequently, the lean-carrier-capable UE 110 determines whether the second barring information is set to "barred" or "not barred" (step S440).

If the second barring information is set to "barred", the lean-carrier-capable UE 110 is not allowed to access the cell (step S450). That is, the lean-carrier-capable UE 110 is refrained/stopped from accessing the cell in response to the second barring information being set to "barred". Otherwise, if the second barring information is set to "not barred", the lean-carrier-capable UE 110 is allowed to access the cell (step S460).

Figure 5:
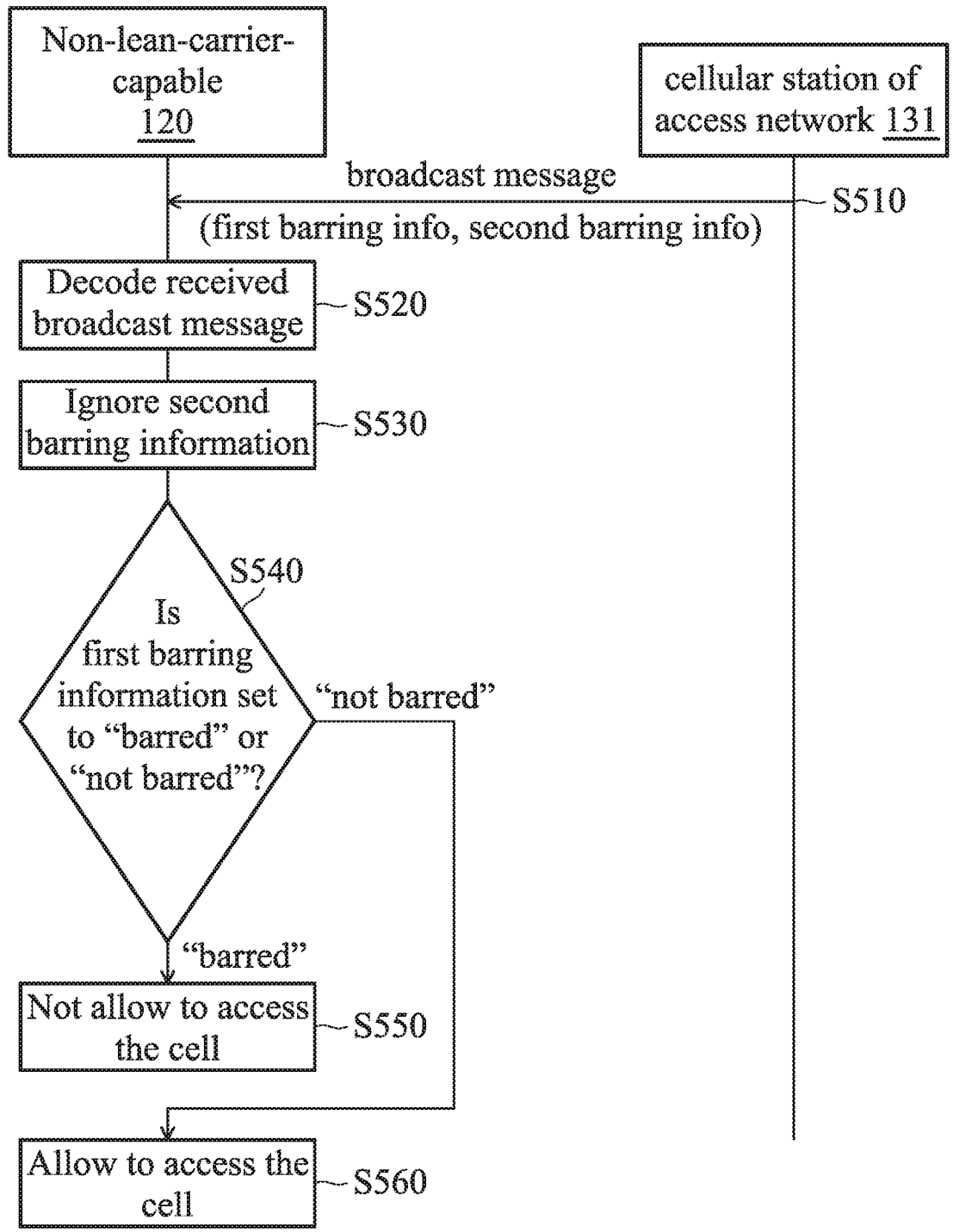
FIG. 5 is a message sequence chart illustrating the access control method according to another embodiment of the application.

FIG. 5 is a message sequence chart illustrating the access control method according to another embodiment of the application.

In this embodiment, the access control method is applied to and executed by a non-lean-carrier-capable UE (e.g., the non-lean-carrier-capabley UE 120) and a cellular station (e.g., a cellular station of the service network 130) enabling network-based CRS interference mitigation.

To begin with, the cellular station sends a broadcast message (e.g., a SIB-1 message) to the non-lean-carrier-capable UE 120, wherein the broadcast message includes first barring information (e.g., a cellBarred IE) indicating that the cell is barred for UEs not supporting network-based CRS interference mitigation (i.e., non-lean-carrier-capable UEs) and second barring information (e.g., a cellBarred-CRS IE) indicating whether the cell is barred for UEs supporting network-based CRS interference mitigation (i.e., non-lean-carrier-capable UEs) (step S510).

Next, the non-lean-carrier-capable UE 120 receives and decodes the broadcast message (step S520), and then ignores the second barring information in response to the legacy UE 120 not supporting network-based CRS interference mitigation (step S530). Specifically, by ignoring the second barring information, it means that the non-lean-carrier-capable UE 120 cannot decode the second barring information due to late Abstract Syntax Notation One (ASN.1) code insertion.

Subsequently, the legacy UE 120 determines whether the first barring information is set to "barred" or "not barred" (step S540).

If the first barring information is set to "barred", the non-lean-carrier-capable UE 120 is not allowed to access the cell (step S550). That is, the non-lean-carrier-capable UE 120 is refrained/stopped from accessing the cell in response to the first barring information being set to "barred". Otherwise, if the first barring information is set to "not barred", the non-lean-carrier-capable UE 120 is allowed to access the cell (step S560).

In one embodiment, the broadcast message may include reselection information (e.g., an intraFreqReselection IE) and the reselection information may indicate that reselection to other cells of the same frequency is not allowed if the cellular station enables network-based CRS interference mitigation. That is, subsequent to step S550, the non-lean-carrier-capable UE 120 may reselect to another cell on a different frequency than the frequency that this cell is on. In other words, the non-lean-carrier capable UE 120 refrains from reselecting to other cells on the same frequency as the frequency that this cell is on.

For the convenience of understanding, the following table presents the expected behaviors of lean-carrier-capable UEs and non-lean-carrier-capable UE with respect to the barring information.

TABLE 1

| First barring information (cellBarred IE) | Second barring information (cellBarred-CRS IE) | non-lean-carrier-capable UEs | lean-carrier-capable UEs |
| --- | --- | --- | --- |
| 1 (barred) | 0 (not barred) | Camping not allowed | Okay to camp on the cell |
| 1 (barred) | 1 (barred) | Camping not allowed | Camping not allowed |
| 0 (not barred) | 1 (barred) | Okay to camp on the cell | Camping not allowed |
| 0 (not barred) | 0 (not barred) | Okay to camp on the cell | Okay to camp on the cell |

In view of the forgoing embodiments, it should be appreciated that the present application proposes a control mechanism to ensure that the non-lean-carrier-capable UEs are not affected by the newly introduced lean carrier feature. Specifically, the control mechanism introduces additional barring information (e.g., a cellBarred-CRS IE) in a broadcast message (e.g., a SIB-1 message) to indicate whether lean-carrier-capable UEs are allowed to access a cell enabling network-based CRS interference mitigation, and uses the existing barring information (e.g., a cellBarred IE) to indicate that non-lean-carrier-capable UEs are not allowed to access this cell.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A User Equipment (UE), comprising:
   a wireless transceiver, configured to perform wireless transmission and reception to and from a cell; and
   a controller, configured to receive first barring information and second barring information from the cell via the wireless transceiver, ignore the first barring information in response to the UE supporting network-based Cell-specific Reference Signal (CRS) interference mitigation, and allow the UE to access the cell in response to the UE supporting network-based CRS interference mitigation and the second barring information indicating that the cell is not barred.

2. The UE of claim 1, wherein the controller is further configured to not allow the UE to access the cell in response to the UE supporting network-based CRS interference mitigation and the second barring information indicating that the cell is barred.

3. The UE of claim 1, wherein the controller is further configured to ignore the second barring information in response to the UE not supporting network-based CRS interference mitigation, not allow the UE to access the cell in response to the UE not supporting network-based CRS interference mitigation and the first barring information indicating that the cell is barred, and allow the UE to access the cell in response to the UE not supporting network-based CRS interference mitigation and the first barring information indicating that the cell is not barred.

4. The UE of claim 3, wherein the controller is further configured to receive reselection information from the cell via the wireless transceiver, and not allow the UE to reselect to other cells on the same frequency that the cell is on in response to the UE not supporting network-based CRS interference mitigation, the first barring information indicating that the cell is barred, and the reselection information indicating that intra-frequency reselection is not allowed.

5. The UE of claim 1, wherein the first barring information and the second barring information are received in a broadcast message.

6. The UE of claim 5, wherein the broadcast message is a System Information Block (SIB) type 1 message.

7. The UE of claim 1, wherein the cell is a 4G cell utilizing a Long Term Evolution (LTE)-based technology.

8. An access control method, executed by a User Equipment (UE) communicatively connected to a cell, the access control method comprising:
  receiving first barring information and second barring information from the cell;
  ignoring the first barring information in response to the UE supporting network-based Cell-specific Reference Signal (CRS) interference mitigation; and
  allowing the UE to access the cell in response to the UE supporting network-based CRS interference mitigation and the second barring information indicating that the cell is not barred.

9. The access control method of claim 8, further comprising:
  not allowing the UE to access the cell in response to the UE supporting network-based CRS interference mitigation and the second barring information indicating that the cell is barred.

10. The access control method of claim 8, further comprising:
  ignoring the second barring information in response to the UE not supporting network-based CRS interference mitigation;
  not allowing the UE to access the cell in response to the UE not supporting network-based CRS interference mitigation and the first barring information indicating that the cell is barred; and
  allowing the UE to access the cell in response to the UE not supporting network-based CRS interference mitigation and the first barring information indicating that the cell is not barred.

11. The access control method of claim 10, further comprising:
  receiving reselection information from the cell; and
  not allowing the UE to reselect to other cells on the same frequency that the cell is on in response to the UE not supporting network-based CRS interference mitigation, the first barring information indicating that the cell is barred, and the reselection information indicating that intra-frequency reselection is not allowed.

12. The access control method of claim 8, wherein the first barring information and the second barring information are received in a broadcast message.

13. The access control method of claim 12, wherein the broadcast message is a System Information Block (SIB) type 1 message.

14. The access control method of claim 8, wherein the cell is a 4G cell utilizing a Long Term Evolution (LTE)-based technology.

15. An access control method, executed by a cellular station forming a cell to serve a User Equipment (UE), the access control method comprising:
  setting first barring information to indicate that the cell is barred for UEs not supporting network-based Cell-specific Reference Signal (CRS) interference mitigation and setting second barring information to indicate whether the cell is barred for UEs supporting network-based CRS interference mitigation, in response to the cellular station enabling network-based CRS interference mitigation; and
  sending the first barring information and the second barring information to the UE.

16. The access control method of claim 15, wherein the first barring information and the second barring information are sent in a broadcast message.

17. The access control method of claim 16, wherein the broadcast message is a System Information Block (SIB) type 1 message.

18. The access control method of claim 15, wherein the cell is a 4G cell utilizing a Long Term Evolution (LTE)-based technology.

* * * * *